(12) United States Patent
Tagny Diesse

(10) Patent No.: US 10,672,078 B1
(45) Date of Patent: Jun. 2, 2020

(54) SCORING OF INSURANCE DATA

(71) Applicant: Allstate Insurance Company, Northbrook, IL (US)

(72) Inventor: Patrick Christian Tagny Diesse, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 187 days.

(21) Appl. No.: 14/281,545

(22) Filed: May 19, 2014

(51) Int. Cl.
*G06Q 40/08* (2012.01)

(52) U.S. Cl.
CPC .................................... *G06Q 40/08* (2013.01)

(58) Field of Classification Search
None
See application file for complete search history.

(56) References Cited

U.S. PATENT DOCUMENTS

| | | | | |
|---|---|---|---|---|
| 6,546,379 | B1* | 4/2003 | Hong | G06K 9/6256 706/14 |
| 8,069,190 | B2 | 11/2011 | McColl et al. | |
| 8,370,280 | B1* | 2/2013 | Lin | G06N 99/005 706/12 |
| 8,443,013 | B1* | 5/2013 | Lin | G06Q 10/04 707/810 |
| 8,464,075 | B2 | 6/2013 | Gnanasambandam et al. | |
| 8,997,248 | B1* | 3/2015 | McKay | H04L 63/0428 726/27 |
| 2002/0194119 | A1* | 12/2002 | Wright | G06Q 20/10 705/38 |
| 2007/0027726 | A1* | 2/2007 | Warren | G06Q 40/08 705/4 |
| 2010/0145734 | A1* | 6/2010 | Becerra | G06Q 10/087 705/4 |
| 2011/0213628 | A1* | 9/2011 | Peak | G06Q 40/08 705/4 |
| 2011/0302583 | A1* | 12/2011 | Abadi | G06F 17/30545 718/102 |
| 2012/0016816 | A1* | 1/2012 | Yanase | G06N 99/005 706/10 |

(Continued)

FOREIGN PATENT DOCUMENTS

WO 2013036677 A1 3/2013

OTHER PUBLICATIONS

Six Business-Changing Ways to Use Big Data; http://www.insurancenetworking.com/blogs/big-data-hadoop-mapreduce-30237-1.html.

(Continued)

*Primary Examiner* — William J Jacob
(74) *Attorney, Agent, or Firm* — Banner & Witcoff, Ltd.

(57) ABSTRACT

Methods, apparatuses, and systems for applying models to score insurance data are disclosed. In one aspect, a system comprising a master node, a plurality of nodes in at least one cluster connected to the master node, and one or more computing devices connected to the master node is disclosed, where the master node is configured to distribute, using a HIVE module, an insurance scoring script and a predictive model to each of the plurality of nodes. The master node may call a function of the HIVE module to instruct each of the plurality of nodes to execute the insurance scoring script to generate scored results, wherein the scored results are written into a results table, and wherein the scored results comprise insurance scores for a plurality of customers.

19 Claims, 9 Drawing Sheets

(56) References Cited

U.S. PATENT DOCUMENTS

| | | | |
|---|---|---|---|
| 2012/0278275 A1 | 11/2012 | Danciu et al. | |
| 2013/0279672 A1 | 10/2013 | Mohan et al. | |
| 2013/0325608 A1 | 12/2013 | Kulkarni et al. | |
| 2014/0032240 A1 | 1/2014 | Lougheed et al. | |
| 2014/0046879 A1 | 2/2014 | Maclennan et al. | |
| 2014/0058784 A1 | 2/2014 | Gujar et al. | |
| 2014/0081652 A1* | 3/2014 | Klindworth | G06Q 10/10 705/2 |
| 2014/0095214 A1* | 4/2014 | Mathe | G06Q 40/08 705/4 |
| 2014/0357961 A1* | 12/2014 | Meltzer | A61B 5/0002 600/301 |
| 2015/0081578 A1* | 3/2015 | McLaughlin | G06Q 10/1057 705/322 |
| 2015/0302075 A1* | 10/2015 | Schechter | G06F 17/30144 707/641 |
| 2015/0319185 A1* | 11/2015 | Kirti | H04L 67/306 726/23 |
| 2015/0320996 A1* | 11/2015 | Eggen | A61N 1/056 607/127 |
| 2015/0356162 A1* | 12/2015 | Zhang | G06F 17/30224 707/603 |
| 2017/0177665 A1* | 6/2017 | Chang | G06F 17/30463 |

OTHER PUBLICATIONS

Financial Companies Do Hadoop; http://hortonworks.com/industry/financial/.

The Evolving Role of the Enterprise Data Warehouse in the Era of Big Data Analytics; http:www.montage.co.nz/assets/Brochures/DataWarehouseBigDataAnalyticsKimball.pdf.

Financial Services Data Management: Big Data Technology in Financial Services, Jun. 2012.

Using IBM Insurance Information Warehouse & Big Data to Augment a Data Warehouse, pp. 1-14.

Capitalizing on Big Data Analytics for the Insurance Industry, pp. 1-18, 2012.

Predictive Analytics Software Suite, 12 pgs.

Update: StackIQ Cluster Manager Now Integrated With Cloudera; http:\\web.stackiq.com/blog/?Tag=hadoop+cluster, pp. 1-11, Mar. 14, 2014.

Oracle Big Data Next Generation Data Management, 52 pgs.

First Look: Dulles Research Carolina Update; http:\\decisionmanagementsolutions.com/blog/tag/scoring, pp. 1-9, Mar. 14, 2014.

Business Value of Hadoop; www.hortonworks.com; Jun. 2013.

Hadoop What it is and why it matters; htthttp:\\sas.com/en_us/insights/big-data/hadoop.html, pp. 1-8, Mar. 14, 2014.

\* cited by examiner

SCORING OF INSURANCE DATA

FIELD OF ART

Aspects of the disclosure generally relate to the fields of data scoring. In particular, this disclosure provides methods, apparatuses, and systems for applying models to score insurance data.

BACKGROUND

Insurance companies may maintain insurance data and account information for thousands or millions of customers. Each customer may be issued an insurance policy number and a premium amount based on the particular insurance policy. The premium amount for a particular insurance policy may be calculated based on a variety of factors, such as a territory factor (e.g., a zip code/location of an asset), age factor (e.g., number of months in the life of a person or asset), vehicle factor, claim history factor, and other factors known to a person having ordinary skill in the art.

In order to calculate premium amounts and other rates, insurance companies may employ algorithms to score insurance data. In a traditional insurance system, each of the aforementioned insurance factors may be assessed, and the system obtains/assigns values for each factor. The system then engages in various calculations to determine an insurance rate/premium to assign to the insurance policy. There may be numerous insurance factors being assessed for thousands or millions of insurance policy-holding customers, resulting in a large amount of data (e.g., big data). The requisite calculations and scoring may entail processing the large amount of data and may necessitate substantial coordination with one or more systems and processor-intensive, time-consuming calculations. As such, there is room for improvement of these prior art systems and methods of scoring insurance rates/premiums.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, and apparatuses for providing a system architecture and/or tool configured for applying models to score insurance data. The disclosure describes a system comprising a master node, a plurality of nodes in at least one cluster connected to the master node, and one or more computing devices connected to the master node, wherein the master node is configured to perform one or more of the steps described herein. The disclosure also describes an apparatus comprising a processor and a memory storing computer-executable instructions that, when executed by the processor, cause the apparatus to perform one or more of the steps described herein.

In addition, aspects of this disclosure provide a method that may include creating, by a computer processor, an input table in memory, loading, into the input table, insurance data of a plurality of customers, creating a first file directory path to an insurance scoring script and a second file directory path to a predictive model, and distributing, by the computer processor using a HIVE module, the insurance scoring script and the predictive model to each of a plurality of nodes in at least one cluster. The method may also include creating a results table in the memory, calling a function of the HIVE module to instruct each of the plurality of nodes to execute the insurance scoring script to generate scored results, and writing the scored results into the results table, wherein the scored results comprise insurance scores for the plurality of customers.

Further, aspects of this disclosure provide an apparatus comprising a network interface configured to communicate, via a network, with at least one of a first computing device or a second computing device. The processor(s) may be configured to cause the apparatus to receive, from the first computing device or the second computing device, an insurance scoring script to score a distinct portion of insurance data and receive, from the first computing device or the second computing device, a predictive model. The processor(s) may also cause the apparatus to define model parameters for the predictive model, specify at least one variable, variable type, and categorical level corresponding to the insurance data, and score the distinct portion of the insurance data by applying the predictive model.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited in the accompanying figures in which like reference numerals indicate similar elements and in which.

DETAILED DESCRIPTION

Figure 1:
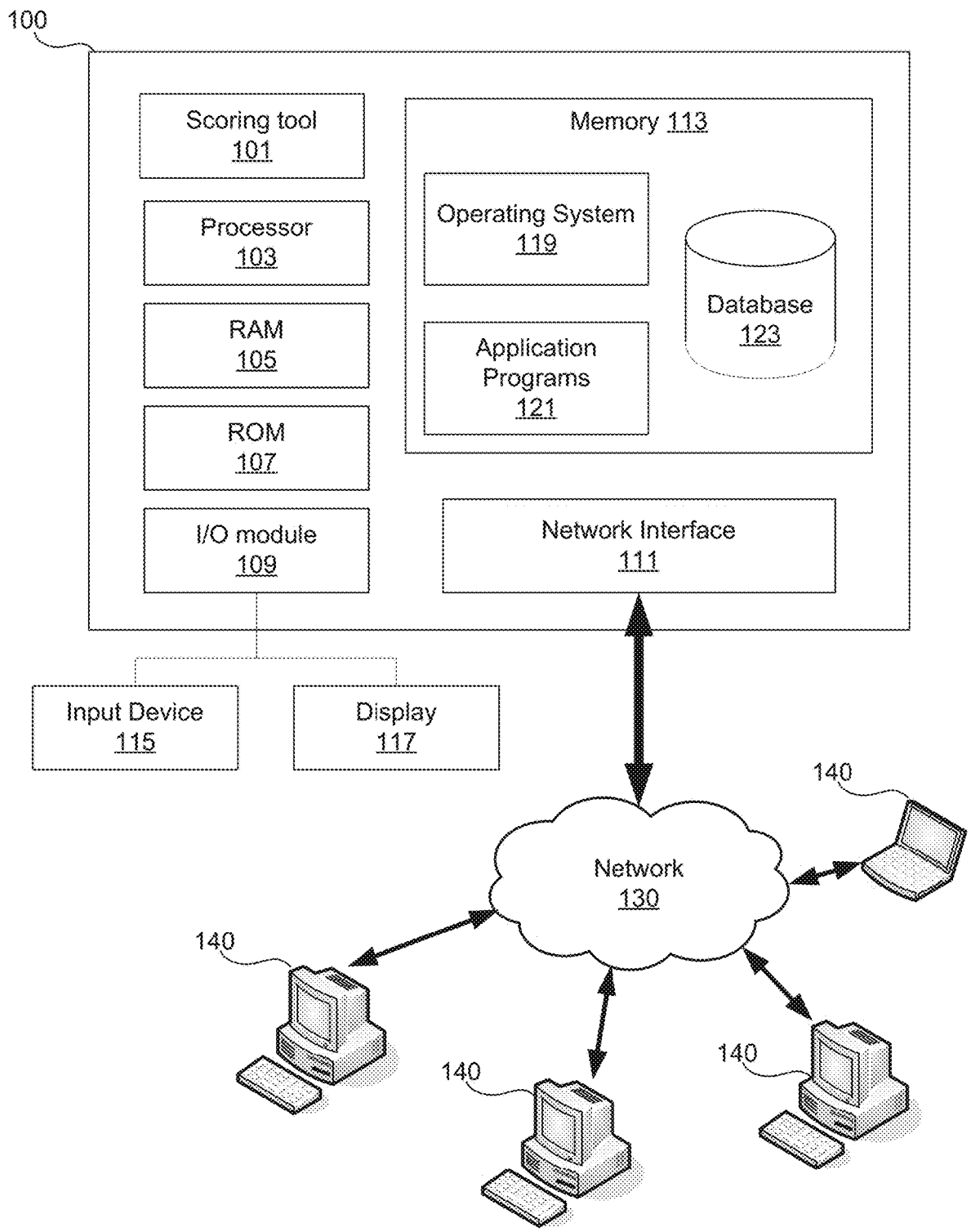
FIG. 1 is a block diagram of an example computing device that may be used according to an illustrative embodiment of the present disclosure.

In accordance with various aspects of the disclosure, methods, apparatuses, and systems are disclosed for scoring insurance data. This disclosure describes using HADOOP and HIVE functionalities to apply a predictive model to score insurance data for a plurality of customers. The predictive model and an insurance scoring script may be distributed by HIVE to a plurality of nodes in at least one HADOOP cluster. The predictive model may be applied by calling a function of HIVE to execute an insurance scoring script to score insurance data at each of the plurality of nodes. The scored results may then be written into a results table comprising insurance scores for tiers of the plurality of customers. Herein, a "table" is used to refer to various data structures that allow data to be depicted in a row and column format.

The plurality of customers may be offered, by a company, insurance policies (e.g., insurance policies for a home, automobile, rental property, jewelry, etc.) with varying renewal rates and insurance premiums based on different insurance factors. The different insurance factors may comprise, for example, gender, age, area, income, type of home, cost of home, vehicle type, and claim history for each of the plurality of customers. The renewal rates and insurance premiums may be calculated per tier of the plurality of customers, with each tier representing a subset of insurance policy holders grouped together based on similarities in their insurance data. Customers of a common tier may be assigned a common insurance rating factor to be used in scoring insurance data. Specifically, the predictive model and insurance scoring script may be employed to calculate insurance scores, such as renewal rates per tier and premiums per tier, for the plurality of customers.

The present disclosure may be advantageous in providing a method to score a large amount of insurance data (also referred to herein as "big data") for the plurality of customers in an efficient, distributed manner by utilizing HADOOP and HIVE. For example, HIVE may be used to chunk up big data and distribute the chunks of data to different nodes in a HADOOP cluster so that the nodes may process the chunks in parallel. In an embodiment, insurance scores for thousands or millions of customers may be computed in a matter of minutes, resulting in a fast and less time-consuming method for insurance data processing.

By distributing the scoring script and model to each of a plurality of nodes, the HIVE Transform function may be used to divide up insurance data amongst the plurality of nodes. Accordingly, a user may write a single scoring script that may be executed in parallel to score different portions of data. Moreover, the scoring script may be written in any language (e.g., R, PYTHON, JAVA, etc.), and thus, the user can write the scoring script in a computer language of his/her preference.

Additionally, a user may choose any model to apply to the insurance data. For example, the user may choose a generalized linear model (GLM), a generalized boosted model (GBM), a regression model, or another predictive model. The user may choose and/or modify the model to obtain certain results from the data scoring. By simply changing a file directory path to the model, the user may be able to score an input table comprising insurance data with various models of his/her preference.

The data scoring features described in the present disclosure may be applied to obtain insurance scores related to a complementary group rating (CGR) system. The CGR system may determine an insurance rating factor for a user's insurance policy and allow price optimization at an individual policy level. The CGR system may result in a structural modification to an existing rating plan (e.g., an insurance rating plan) to allow pricing decisions to be made at a more granular (e.g., finer) level. The CGR system may assign CGR factors to microsegments via CGR tier designations. For example, users or customers with insurance policies may each be assigned to a microsegment, wherein a microsegment is a predefined combination of characteristics (e.g., user characteristics) that, taken together, define the user. Each microsegment may then be mapped to a CGR tier, wherein the user insurance policies may be grouped into tiers (e.g., CGR tiers), where each tier is characterized by a separate insurance rating factor. Additionally, each CGR tier (e.g., a tier code or other value) may correspond to a CGR factor, wherein the CGR factor comprises a numeric value that may be incorporated into an insurance premium or renewal rate calculation for an insurance policy. The present disclosure may provide a method to apply a predictive model to score insurance data in each CGR tier, wherein each CGR tier may comprise data related to a plurality of insurance policies assigned to a corresponding microsegment.

Aspects of this disclosure may be applied to assign microsegments, CGR tiers, and CGR factors to insurance data and to compute insurance scores for a plurality of customers. Further details about CGR and the assignment of microsegments, CGR tiers, and CGR factors are described in the disclosure of the following patent application, which is incorporated by reference herein in its entirety: U.S. patent application Ser. No. 14/075,650, filed Nov. 8, 2013 and entitled "Pre-Calculated Insurance Premiums."

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a method, a computer system, or a computer program product. Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a scoring tool 101 configured to perform methods and execute instructions to score data as described herein. The scoring tool 101 may be implemented with one or more specially configured processors and one or more storage units (e.g., databases, RAM, ROM, and other computer-readable media), one or more application specific integrated circuits (ASICs), and/or other hardware components. Throughout this disclosure, the scoring tool 101 may refer to the software (e.g., a computer program or application) and/or hardware used to perform scoring. Specifically, the scoring tool 101 may comprise HADOOP and HIVE software modules to execute insurance data scoring as described herein. The scoring tool 101 may employ HADOOP and HIVE software to analyze and process large data sets on a plurality of nodes in a cluster. By using HADOOP and HIVE, the scoring tool 101 may distribute operations among the plurality of nodes in the cluster, implement data scoring in parallel at each of the nodes, and reduce the results into a single results table.

The one or more specially configured processors of the scoring tool 101 may operate in addition to or in conjunction with another general processor 103 of the computing device 100. In some embodiments, the scoring tool 101 may be a software module executed by one or more general processors 103. Both the scoring tool 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example embodiment of a computing device 100. In other embodiments, the computing device 100 may include fewer or more elements. For example, the computing device 100 might not include the general processor 103 in addition to one or more processors of the scoring tool 101. The computing device 100 may be a mobile device (e.g., a smartphone, tablet), and thus, may also include various other components, such as a battery, speaker, and antennas (not shown).

Figure 2:
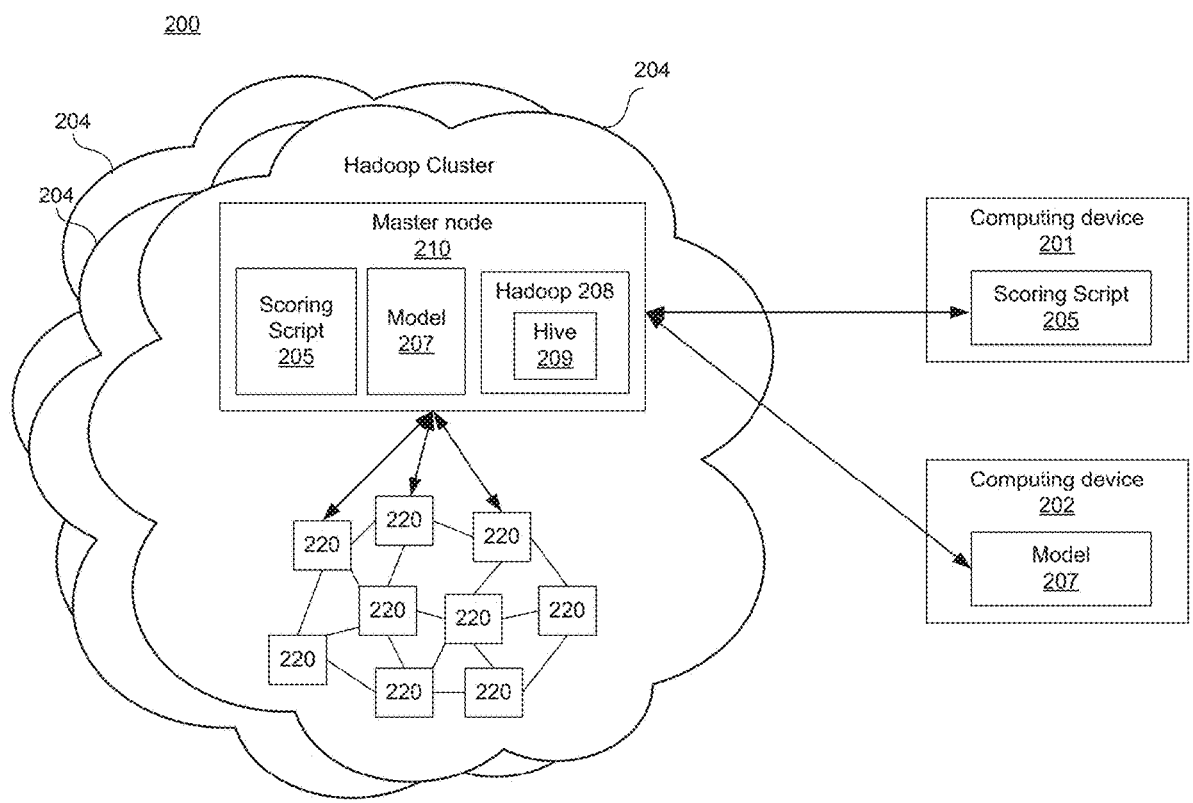
FIG. 2 illustrates an example system for implementing methods according to the present disclosure.

The scoring tool 101 disclosed herein may be useful to more than one user involved in scoring insurance data. Therefore, the scoring tool 101 may be configured for operation by a number of users. FIG. 2 illustrates an example system 200 for implementing methods according to the present disclosure. As shown in FIG. 2, the system 200 may include a first computing device 201 and a second computing device 202 connected to one or more HADOOP clusters 204 by a master node 210.

The one or more HADOOP clusters 204 may comprise a HADOOP software framework for storage and distributed processing of large data sets, such as big data. The one or more HADOOP clusters 204 may be designed to scale up from a single server or computing device to thousands of machines in order to handle computationally intensive processing of insurance data. Each machine in the one or more HADOOP clusters 204 may offer local computation and storage for scoring insurance data.

As illustrated in FIG. 2, the one or more HADOOP clusters 204 may comprise a plurality of nodes 220. Each node may be a different machine (e.g., a computer or server) or a different processor of the same machine. HADOOP may determine the number of clusters 204 and the number of nodes 220 in each cluster 204. This determination may be made based on various settings, including user defined settings (e.g., target processing time), and/or a file size of the data to be processed. For example, HADOOP may assign more nodes 220 to a cluster 204 for data having a larger file size or for performing a particular process, such as for scoring insurance data.

Although only nine nodes are illustrated in the plurality of nodes 220, there may be any number of nodes in the plurality of nodes 220. For example, there may be 1 node, 20 nodes, 40 nodes, or 100 nodes in the one or more HADOOP clusters 204. Additionally, any of the plurality of nodes 220 may be a part of a single HADOOP cluster 204 or multiple HADOOP clusters 204. For example, there may be any number of nodes 220 in any number of HADOOP clusters 204. The plurality of nodes 220 may be interconnected as illustrated in system 200. Additionally, each node 220 may be connected to a subset of different nodes 220. In another embodiment, the plurality of nodes 220 might not be connected to each other, wherein the plurality of nodes 220 may simply be connected to the master node 210 in the one or more HADOOP clusters 204.

Each of the plurality of nodes 220 may be employed to score distinct portions of insurance data, wherein the distinct portions of the insurance data may be divided up and delivered to a respective one of the plurality of nodes 220 by the master node 210. The plurality of nodes 220 may access the distinct portions of the insurance data in a data structure (e.g., a single large table) stored in a searchable data store, such as a database or a file system. In some embodiments in accordance with various aspects of the disclosure, the plurality of nodes 220 may be referred to as a HADOOP distributed file system (HDFS), wherein the plurality of nodes 220 may each include a searchable data store. The HDFS may represent a file system that spans across all the nodes 220 in a HADOOP cluster 204 for data storage. The searchable data stores in the plurality of nodes 220 may be linked together to represent the HDFS as a single large file system.

In an embodiment, the plurality of nodes 220 may be referred to as slave nodes that correspond to and receive instructions from the master node 210. The master node 210 may manage data scoring at the plurality of nodes 220 by accessing the insurance data, distributing distinct portions of the insurance data to the plurality of nodes 220, and running parallel computations by using HADOOP and HIVE software. In an embodiment, there may be one or more master nodes 210 that are connected to the plurality of nodes 220. The master node 210 may include one or more file directory paths to a scoring script 205 and a model 207. In another embodiment, the master node may include copies of the scoring script 205 and the model 207. The scoring script 205 may be a computer program that scores insurance data based on the model 207. In an embodiment, the scoring script 205 and the model 207 may be written in a programming language, such as R or Python. The model 207 may be any predictive model employed to analyze and score insurance data as known to a person having ordinary skill in the art. In an embodiment, the model 207 may be a generalized linear model (GLM), a generalized boosted model (GBM), or a regression model.

The master node 210 may retrieve the scoring script 205 and the model 207 from the first computing device 201 and the second computing device 202, respectively. In an embodiment, the scoring script 205 and the model 207 may be written and/or stored on the same computing device 201 or 202. In another embodiment, the first and second computing devices 201-202 may be the same as computing devices 140 in FIG. 1. Additionally, the first and second computing devices 201-202 may be referred to as client devices or client machines. The first and second computing devices 201-202 may be associated with one or more users who compile the insurance data and write the scoring script 205 and the model 207.

The master node 210 may include a HADOOP application 208, wherein the HADOOP application 208 further comprises a HIVE module 209. The HIVE module 209 may support HADOOP and HIVE functionality for distributing the scoring script 205 and the model 207 among the plurality of nodes 220 in the one or more HADOOP clusters 204 and implementing data scoring in parallel at each of the plurality of nodes 220. For example, the HIVE module 209 may split up big data, such as insurance data, and distribute different chunks or portions of data to the plurality of nodes 220 for parallel processing. Additionally, each node 220 may comprise HADOOP and HIVE software (e.g., drivers, modules, etc.) and may be specifically designated to execute HADOOP-based processing of data.

The HIVE module 209 may include built-in functions and user-defined functions (UDFs) that may be written in Java, Python, or a HIVE Structured Query Language (HIVESQL) to perform specific tasks. In an embodiment, the HIVE module 209 may employ a HIVE Transform function to implement scoring of insurance data by HIVE streaming. HIVE streaming is a utility of HADOOP/HIVE that allows users to create and run a particular job by using a Map/Reduce functionality of HADOOP. The Map/Reduce functionality refers to mapping out operations and processing to the plurality of nodes 220 in the one or more HADOOP clusters 204 and reducing the results into a single table. For example, HIVE may create a Map/Reduce job, submit the job to the one or more HADOOP clusters 204, and monitor the progress of the job until completion.

In an embodiment, the HIVE module 209 may assess the file size of the insurance data (e.g., number of megabytes, gigabytes) and may determine the number of nodes 220 that are available to conduct the scoring of data. The HIVE module 209 may then divide the insurance data according to the file size of the insurance data and the number of nodes 220 in the one or more HADOOP clusters 204 in order to obtain distinct portions of the insurance data. These distinct portions of the insurance data may subsequently be transmitted to the respective nodes 220 by the master node 210. By way of further example, the file size of the insurance data may be 120 MB total, and there may be three nodes 220 available for scoring. The 120 MB may be divided among the nodes 220 into three 40 MB portions of the data in order to maximize usage of the nodes 220 and conduct scoring efficiently. Although this example illustrates that the insurance data may be divided into equally-sized portions, in other examples, the portions may be of different sizes. For example, if the total size of the insurance data is 256 MB, two of the three nodes may each get 100 MB, and the third node may get 56 MB.

The master node 210 may call the HIVE Transform function of the HIVE module 209 to instruct each of the plurality of nodes 220 to execute the scoring script 205 to generate a calculated score for each row of the insurance data in an input table. Each node 220 may score a distinct portion of the insurance data, wherein the generated results may be passed back to the master node 210. The master node 210 may compile the calculated scores for each row of the insurance data in a scored results table.

In an embodiment, each node 220 may score a distinct portion comprising multiple rows of data, wherein the HIVE module 209 determines the number of rows of data scored by each node 220. The HIVE module 209 may also determine how many nodes 220 are employed for processing in the one or more HADOOP clusters 204.

Ultimately, the system 200 may be employed to score insurance data and compute renewal rates and insurance premiums per tier of the plurality of customers. The insurance data may comprise insurance factors and a plurality of policy numbers corresponding to the plurality of customers. Insurance factors may include, for example, gender, age, area, income, type of home, cost of home, vehicle type, and claim history for each of the plurality of customers.

Table 1 shows an example of insurance data comprising insurance factors and corresponding values. This information in Table 1 may correspond to the insurance data loaded into an input table by the master node 210.

TABLE 1

An example of insurance data

| Policy # | Name | Gender | Age | Area | Vehicle | Claim History | Years as Customer |
|---|---|---|---|---|---|---|---|
| 1 | John | Male | 20 | FL | Sedan | 0 | 3 |
| 2 | Jane | Female | 42 | VA | SUV | 5 | 20 |
| 3 | Bob | Male | 31 | TX | Truck | 2 | 11 |
| 4 | Mary | Female | 64 | NY | Van | 7 | 40 |

The insurance policies for the plurality of customers may be grouped into insurance tiers (e.g., CGR tiers), with each tier representing a subset of customers grouped together based on similarities in their insurance data. Customers of a common tier may be assigned a common insurance rating factor to be used in scoring insurance data. Tiers may be assigned based on one or more insurance factors, such as age, gender, or area. In an embodiment, all male customers may be assigned to tier 1, whereas all female customers may be assigned tier 2. In another embodiment, customers between the ages of 20 and 35 may be assigned to tier 1, whereas customers between the ages of 40 and 65 may be assigned to tier 2. Insurance tiers may be allocated according to any predetermined algorithm known to a person having ordinary skill in the art.

Table 2 illustrates another example of how insurance data may be grouped into different tiers.

TABLE 2

An example of insurance data and tier assignment

| Policy # | Tier # | Name | Gender | Age | Area | Vehicle | Claim History | Years as Customer |
|---|---|---|---|---|---|---|---|---|
| 1 | 1 | John | Male | 20 | FL | Sedan | 0 | 3 |
| 2 | 2 | Jane | Female | 42 | VA | SUV | 5 | 20 |
| 3 | 1 | Bob | Male | 31 | TX | Truck | 2 | 11 |
| 4 | 2 | Mary | Female | 64 | NY | Van | 7 | 40 |

Although only two tiers are illustrated in Table 2, there may be any number of tiers employed to group the insurance policies. After policies have been classified into different tiers, customers may be assigned insurance premiums per tier or renewal rates per tier, which may be calculated by applying predictive models as described herein. The premiums per tier and/or renewal rates may then be used in various algorithms to determine a premium for each customer and/or any value for evaluating customers.

Due to the large number of insurance policies associated with thousands or millions of customers at a company, the plurality of nodes 220 in the one or more HADOOP clusters 204 may be utilized to score insurance data in an efficient approach. In an embodiment, each node 220 may be assigned by the master node 210 to score one or more chunks of insurance data. The master node 210 may divide the insurance data among the plurality of nodes 220. If there are ten nodes 220, and the master node 210 divides the insurance data into seventeen chunks, the master node 210 may distribute one chunk to each of the ten nodes 220 and the remaining seven chunks to seven of the ten nodes 220. In some embodiments, the insurance data may be divided up based on tiers, and then different tiers may be assigned to respective nodes 220. The scoring script 205 and the model 207 may be distributed to each of the plurality of nodes 220 by the HIVE module 209 on the master node 210. The HIVE module 209 may employ a HIVE Transform function to execute the scoring script 205 at each node 220.

An example of pseudocode for the scoring script 205 is shown below:

my_model my model←load_model (path_to_model_object) //Path is passed by HIVE as an argument to script
define_any_necessary_parameters( ) //For GBM this can be number of trees
data←read (delim="\t", header=FALSE) //delimiter is dictated by HIVE
specify_variable_types_and_categorical_levels (data)
predictions←apply_model (my_model, data)
combined_results←frame (data, predictions) /*Use if original predictor variables along with their score is desired output */print (delim="\t", combined_results) //delimiter is dictated by HIVE In this pseudocode, the scoring script 205 may initially load the model 207 on the respective node 220 on which the scoring script 205 is executing. In an embodiment, the model 207 may be stored at a file directory path corresponding to the first computing device 201 or the second computing device 202. In another embodiment, the model 207 may be stored on the master node 210. The file directory path to the model 207 may be passed by HIVE to make the model 207 accessible to each of the nodes 220.

Next, the scoring script 205 may define model parameters for the model 207. The model 207 may comprise various model parameters for a GBM model, GLM model, or other models. For example, a model parameter for a GBM model may comprise an n number of trees in the model. The syntax "single.tree" may specify whether or not the model predictions may come from the trees specified in "n.trees." In another example, model parameters for a GLM model may be associated with a link function, wherein the link function may be fit to insurance data. Model parameters may include regression parameters known to a person having ordinary skill in the art. In an embodiment, model parameters may comprise degrees of freedom, scale, shape, tolerance/confidence levels (e.g., confidence intervals), etc. In an embodiment, the scoring script 205 may employ default values for the model parameters. Alternatively, different values for the various model parameters may be set by a user within the scoring script 205.

After defining the model parameters, the scoring script 205 may read the insurance data and identify, specify, and/or define variables, variable types, and categorical levels corresponding to the insurance data. The insurance data may be stored in an input table, and each node 220 may receive a distinct portion of the insurance data. Variables may refer to insurance factors, such as gender, age, area, income, type of home, cost of home, vehicle type, and claim history for each of a plurality of customers. Variable types may refer to the type of variable (e.g., Boolean, double, integer, string, etc.). Categorical levels comprise levels associated with values of each variable. For example, there may be two categorical levels for a gender variable (e.g., male and female), wherein the variable is specified as a Boolean. As another example, there may be four categorical levels for the age variable (e.g., ages 16-22, 23-30, 31-40, 41-55), wherein the variable is specified as a double or integer. The different variables, variable types, and categorical levels of the insurance data may be specified by a user defined function (UDF) within the scoring script 205.

Referring to the last several lines of the illustrative pseudocode shown above, the model 207 may be applied to the insurance data, and a calculated score for each row of the insurance data in the input table may be generated. That is, each node 220 may generate insurance scores for the distinct portions of the insurance data which each node 220 has been assigned. The master node 210 may write the calculated insurance scores for tiers of the plurality of customers into a results table. In an embodiment, the results table may comprise a single column of the calculated insurance scores. In an alternative embodiment, the results table may comprise the combined results of the original variables and values from the input table in addition to the calculated insurance scores. By altering the scoring script, the user may determine what data is outputted in the results table.

The aforementioned scoring script 205 may be executed at each of the plurality of nodes 220 for a distributed scoring of insurance data. This distributed scoring may be implemented in the system 200 by employing HIVE functionality through the HIVE module 209 in the master node 210. The master node 210 may employ a HIVE streaming script to execute the scoring script at each of the plurality of nodes 220.

An example of pseudocode for the HIVE streaming script is shown below:

```
DROP TABLE IF EXISTS Input_Table;
CREATE TABLE Input_Table (VAR1 double,VAR2
    double, STATE Char(2)) ROW FORMAT DELIM-
    ITED FIELDS TERMINATED BY '\t' LINES TER-
    MINATED BY '\n' STORED AS TEXTFILE;
LOAD DATA LOCAL INPATH [path_to_datafile]
    OVERWRITE INTO TABLE Input_Table; //Specify
    the data source
ADD FILE [path_to_scoring_code]; //Add scoring script
    for distribution by HIVE to nodes in cluster
ADD FILE [path_to_model_file]; //Add model for distri-
    bution by HIVE to nodes in cluster
DROP TABLE IF EXISTS Scored_Table;
CREATE TABLE Scored_Table(VAR1 double, VAR2
    double, STATE Char(2), Score double) ROW FOR-
    MAT DELIMITED FIELDS TERMINATED BY '\t'
    LINES TERMINATED BY '\n' STORED AS TEXT-
    FILE; //Create results table to hold results from scoring
INSERT OVERWRITE SCORED TABLE SELECT
    TRANSFORM (VAR1, VAR2, STATE) USING
    '[path_to_scoring_code] [path_to_model_file]' AS
    (VAR1 double, VAR2 double, STATE Char(2), Score
    double) FROM Input_Table; //Use TRANSFORM
    function to run scoring in cluster
```

The code in bold and uppercase in the HIVE streaming pseudocode above indicates Structured Query Language (SQL) or HIVESQL syntax. In this pseudocode, the master node 210 may initially determine if an input table exists, and if so, remove the metadata and data for the existing input table. The master node 210 may then create a new input table with a particular number of rows and columns, specify a data source for insurance data, and load the insurance data of a plurality of customers into the input table. Next, the pseudocode shows that a first file directory path to the scoring code 205 and a second file directory path to the model 207 are created by the master node 210.

After creating the file paths, the master node 210 may determine if a scored table exists, and if so, remove the metadata and data for the existing scored table. In an embodiment, the scored table may also be referred to as the results table. The master node 210 may proceed to create a new scored table, wherein the new scored table may have the same number of rows and columns as the new input table. In another embodiment, the new scored table may comprise a single column for the computed scores. After creating the new scored table, the master node 210 may call the HIVE Transform function to distribute the scoring script 205 and the model 207 to each of the plurality of nodes 220, wherein each node 220 executes the scoring script 205. The master node 210 may then take the insurance scores generated by executing the scoring script 205 at each node 220 and write the results into the new scored table. By employing the scoring script 205 and the HIVE streaming script, a user may be able to apply any model 207 to score insurance data and obtain results in a scored table.

Figure 3:
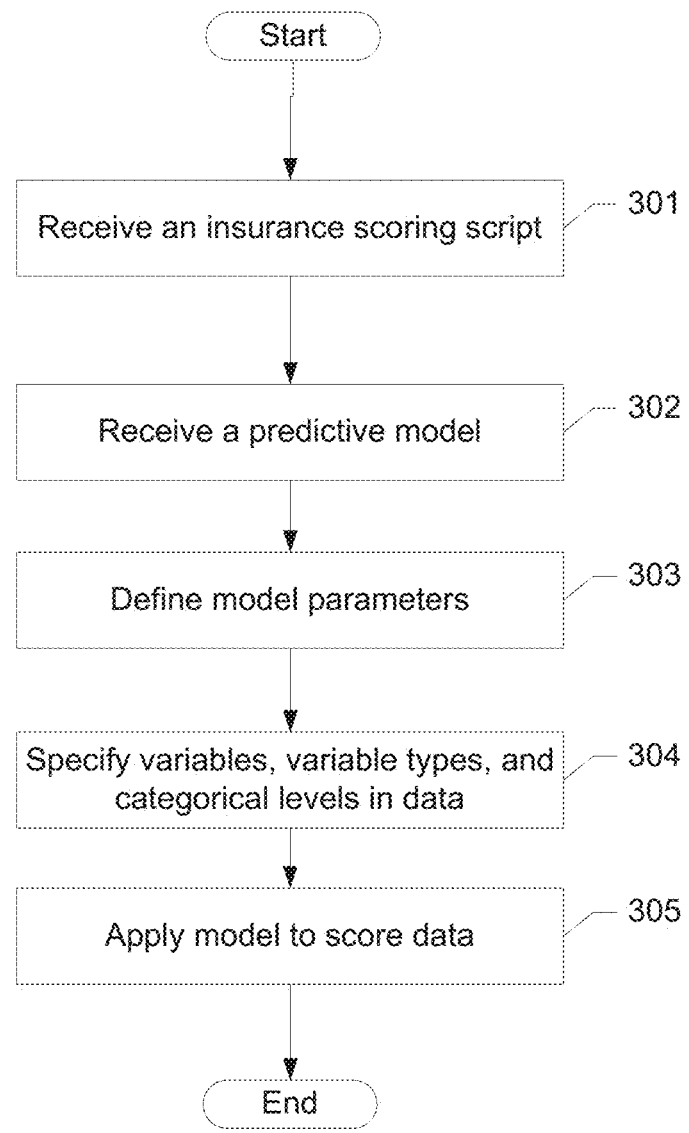
FIG. 3 illustrates a flow diagram of an example process in accordance with aspects of the present disclosure.

FIG. 3 illustrates a flow diagram for an example process in accordance with aspects of the present disclosure. More specifically, FIG. 3 illustrates a plurality of steps implemented in each of the plurality of nodes 220 to apply a predictive model to score insurance data. At step 301, an insurance scoring script may be received from a first computing device or second computing device to score a distinct portion of insurance data. In an embodiment, the plurality of nodes 220 may each receive the scoring script 205 from the first computing device 201 or the second computing device 202. The HIVE module 209 in the master node 210 may distribute the scoring script 205 from the first computing device 201 or the second computing device 202 to each of the plurality of nodes 220 in the one or more HADOOP clusters 204. At step 302, a predictive model may be received from a first computing device or a second computing device. In an embodiment, each of the plurality of nodes 220 may receive the model 207 from the first computing device 201 or the second computing device 202, wherein the model 207 may be distributed to each of the nodes 220 by the HIVE module 209 in the master node 210. At step 303, model parameters for the predictive model may be defined. In an embodiment, the model parameters for the model 207 may be identified in each of the plurality of nodes 220. Exemplary model parameters may comprise a number of trees for a GBM model, a link function for a GLM model, and regression parameters known to a person having ordinary skill in the art, such as degrees of freedom, scale, shape, tolerance/confidence levels (e.g., confidence intervals), etc.

At step 304, at least one variable, variable type and categorical level corresponding to the insurance data may be specified. In an embodiment, variables refer to insurance factors, such as gender, age, area, income, type of home, cost of home, vehicle type, and claim history for each of a plurality of customers, whereas variable types refer to a type of variable assigned to each variable (e.g., Boolean, double, string, etc.). Categorical levels comprise levels associated with values of each variable. The different variables, variable types, and categorical levels of the insurance data may be included in the scoring script 205 and specified at each of the nodes 220. At step 305, the distinct portion of the insurance data may be scored by applying the predictive model. In an embodiment, the model 207 may be applied to generate insurance scores for the distinct portion of the insurance data assigned to each of the plurality of nodes 220. The generated insurance scores may comprise any of the following: renewal raters per tier of the plurality of customers, insurance premiums per tier of the plurality of customers, an expected cost of maintaining a customer, a probability that an insurance claim is fraudulent, etc. For example, if a particular node 220 is given a chunk of data including 1,000 rows for 1,000 different insurance policies, where each row includes 10 columns of values for a respective insurance policy, the particular node 220 may generate 1,000 scores (e.g., insurance premiums per tier, expected loss per tier, renewal probabilities per tier, etc.)—one for each insurance policy.

Figure 4:
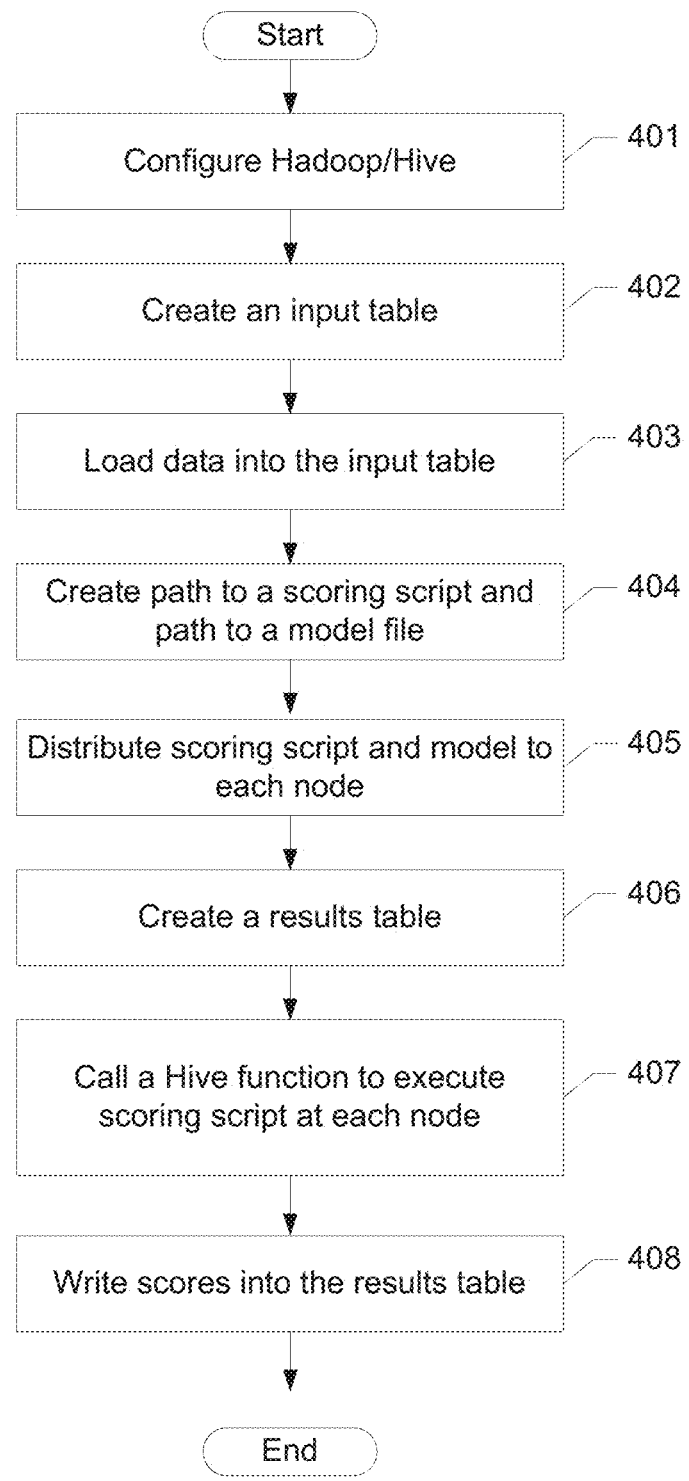
FIG. 4 illustrates a flow diagram of another example process in accordance with aspects of the present disclosure.

FIG. 4 illustrates a flow diagram of another example process in accordance with aspects of the present disclosure. More specifically, FIG. 4 illustrates a plurality of steps implemented in the master node 210 or the computing device 100. For example, a master node 210 may perform one or more of the steps of FIG. 4 to employ a HIVE module 209 to run the scoring script 205 on a plurality of nodes 220 in parallel. In an embodiment, the master node 210 may be similar to the computing device 100, wherein the master node 210 may also comprise a processor (e.g., processor 103), a memory (e.g., memory 113), and other components.

At step 401, HADOOP/HIVE may be configured in the system. In an embodiment, HADOOP/HIVE drivers may be installed on the master node 210 and the plurality of nodes 220 in the one or more HADOOP clusters 204. Each node 220 may be specifically designated to execute HADOOP-based processing of insurance data. Configuring the nodes 220 at step 401 may include establishing wired and/or wireless connections amongst the nodes 220 and between the nodes 220 and the master node 210. Step 401 may also include designating one of the nodes 220 as a master node 210. Further, step 401 may include the entering of user preferences and user settings, such as how many nodes 220 are to be used, how large each chunk of data may be, a target time for execution, security settings, etc.

At step 402, an input table may be created in memory by a computer processor. In an embodiment, the master node 210 may create, using its computer processor 103, an input table in its local memory. This local memory may be housed within the master node 210 or otherwise connected (e.g., through a wired or wireless connection) to the master node 210. At step 403, insurance data of a plurality of customers may be loaded into the input table. In an embodiment, the master node 210 may load insurance data of a plurality of customers into the input table by specifying a data source or storage location of the insurance data. For example, the insurance data may be in a text file (e.g., a file with a .txt extension), a MICROSOFT EXCEL file (e.g., a file with a .xls extension), a comma separated values (CSV) file (e.g., a file with a .csv extension), an R file (e.g., a file with a .rda extension), or in a GOOGLE BIG TABLE file. Such a file may be imported from another database that is used by an insurance company for various purposes, such as setting up policies, making policy information available on the Internet, and generating reports. In step 403, the insurance data in the file may be parsed and inputted into the appropriate row and column of the input table.

Next, a first file directory path to an insurance scoring script and a second file directory path to a predictive model may be created at step 404. In an embodiment, the master node 210 may create a first file directory path to the scoring script 205 and a second file directory path to the model 207. In some embodiments, the first file directory path and the second file directory path may be to a computing device 201 and/or 202 outside the HADOOP clusters 204. Alternatively, the first file directory path and second file directory path may be to one of the nodes 220 in the HADOOP clusters 204 or to any other storage system connected to the master node 210. After creating the paths, at step 405, the insurance scoring script and the predictive model may be distributed to each of a plurality of nodes 220. In an embodiment, the HIVE module 209, executed by a computer processor 103 of the master node 210, may distribute the scoring script 205 and the model 207 to each of the plurality of nodes 220 in the one or more HADOOP clusters 204. At step 406, a results table may be created in the memory. The master node 210 may create a results table its own memory or any other memory connected (either via a wired or wireless connection) thereto.

At step 407, a function of the HIVE module may be called to instruct each of the plurality of nodes to execute the insurance script to generate scored results. In an embodiment, the HIVE module 209 in the master node 210 may call the HIVE Transform function to execute the scoring script 205 at each of the plurality of nodes 220 to score distinct portions of the insurance data. The HIVE Transform function may determine the number of nodes 220 available for processing and the total size of all insurance data to be processed before determining how to divide up the insurance data. Upon determining how to divide up the insurance data, the HIVE Transform function may pass the portions of the insurance data to corresponding nodes 220 for processing. As explained herein, execution of the scoring script 205 by a particular node 220 may include applying a predictive model to the portion of data sent to the particular node 220 to generate a score for each row of the data. Accordingly, each node 220 may execute a different portion of the insurance data in parallel to produce one or more scores.

At step 408, the scores may be written into the results table. For example, the HIVE Transform function may compile the scores received from each of the nodes used for scoring. In an embodiment, the master node 210 may write the scores into the results table, wherein the scores comprise insurance scores for various tiers of the plurality of customers. The insurance scores may comprise renewal rates per tier of the plurality of customers or insurance premiums per tier of the plurality of customers. In addition to writing the scores into the results table, step 408 may also include writing the values of the input table into the results table so that the scores may appear alongside the values that were used to generate them. As such, the results table may include, for example, the input table with an additional column having the score for each row. In some embodiments, a user may determine how scores are compiled in the results table by writing code in the scoring script and the HIVE Transform driver/streaming script.

Figure 5:
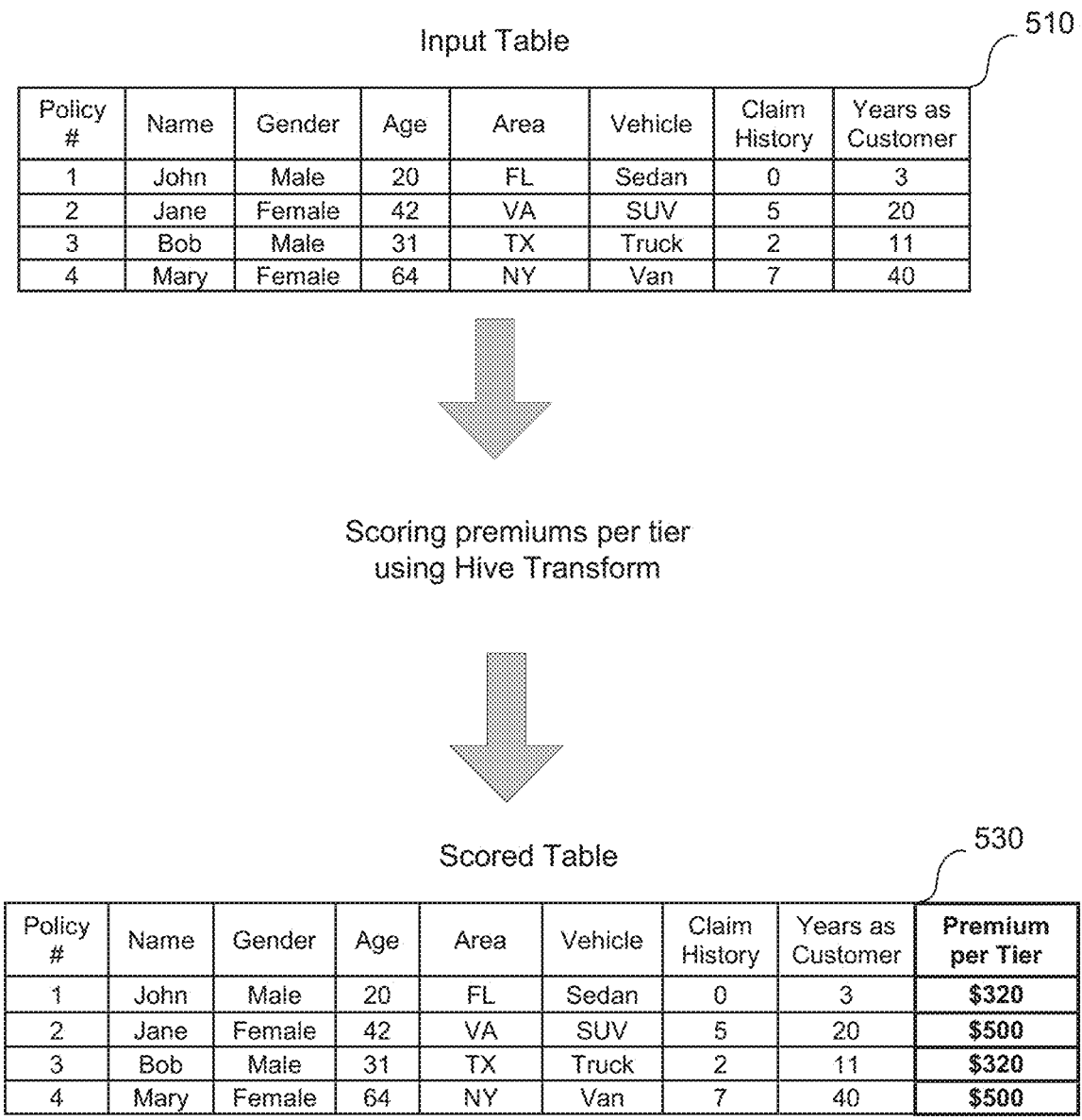
FIG. 5 is a diagram illustrating an example of a results table upon completion of insurance scoring according to aspects of the present disclosure.

FIGS. 5-9 provide diagrams of illustrative results tables upon completion of insurance scoring according to aspects of the present disclosure. Specifically, FIG. 5 shows the results of scoring premiums per tier of the plurality of customers. In FIG. 5, the insurance data including insurance factors and the plurality of policy numbers corresponding to the plurality of customers may be initially loaded into an input table 510. The HIVE transform function may be employed to distribute the insurance data, along with the insurance scoring script 205 and the model 207, among the plurality of nodes 220 in order to conduct insurance scoring at each node 220. The insurance scoring may result in a scored table 530, comprising the compiled insurance scores from each of the nodes 220. In an embodiment, the scored table 530 may comprise a single column with the insurance scores (e.g., premiums per tier). In another embodiment, the scored table 530 may comprise the insurance data from the input table 510, as well as the corresponding column with the insurance scores.

Figure 6:
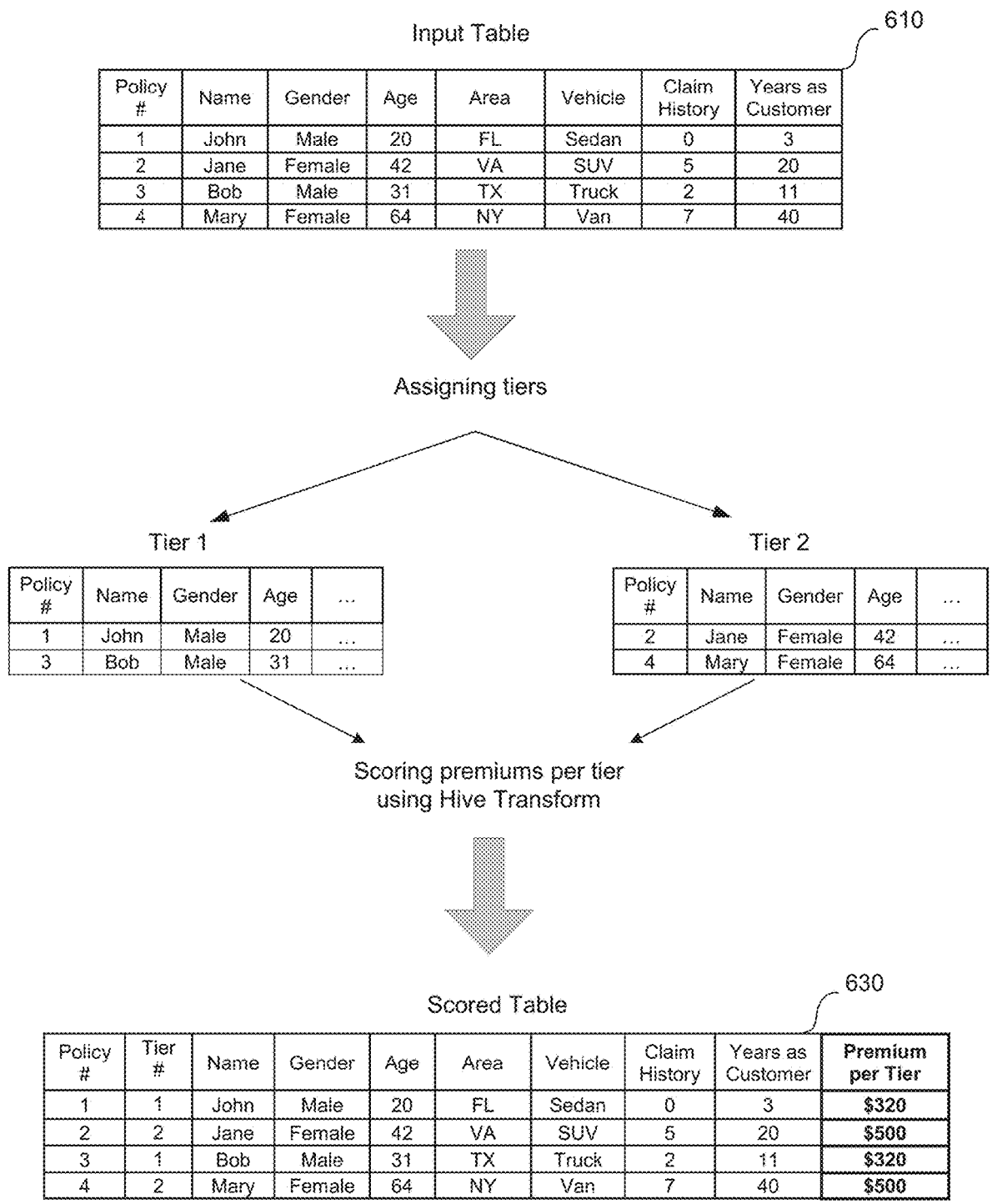
FIG. 6 is a diagram illustrating an example of a results table upon completion of tier assignment and insurance scoring according to aspects of the present disclosure.
Figure 7:
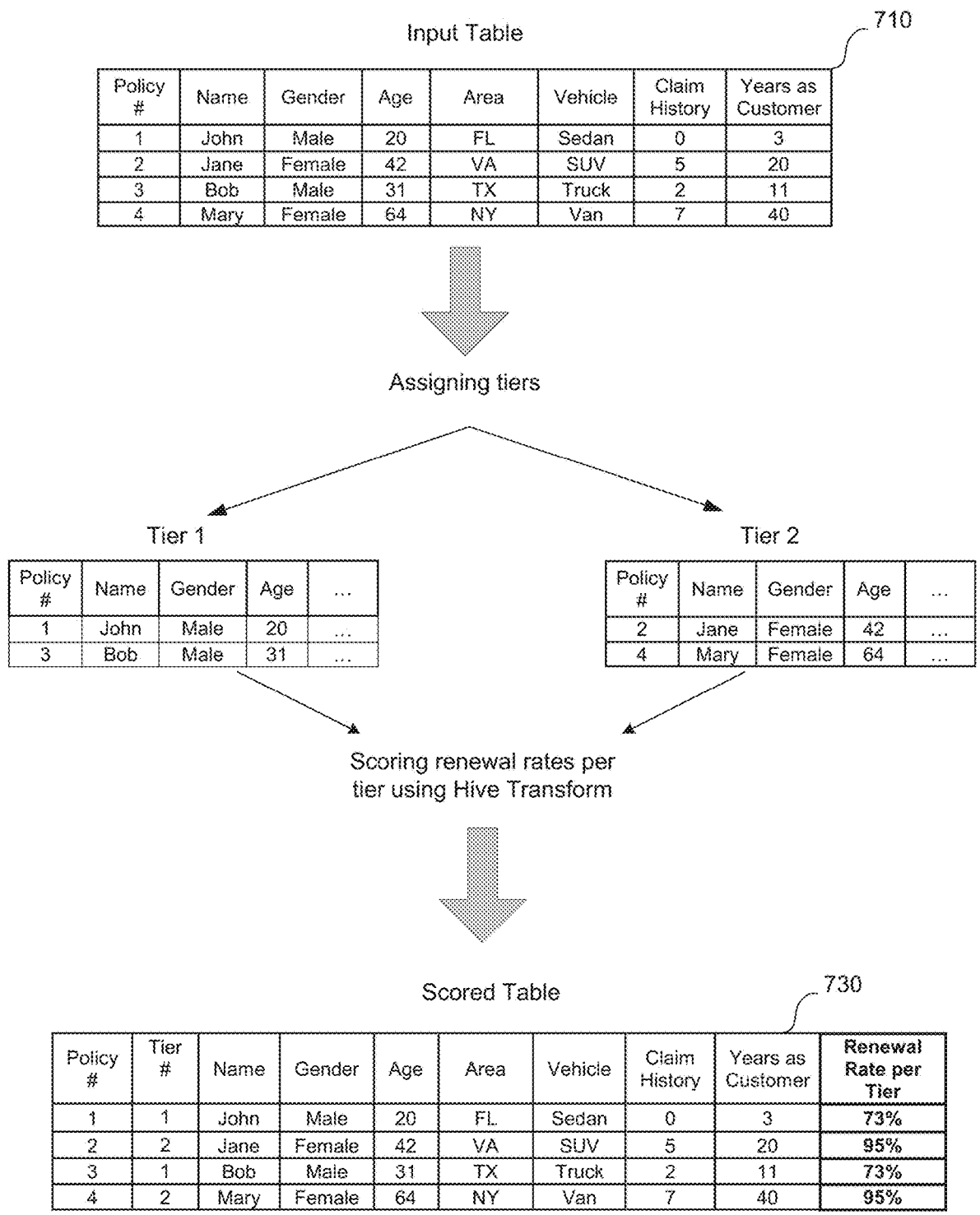
FIG. 7 is a diagram illustrating another example of a results table upon completion of tier assignment and insurance scoring according to aspects of the present disclosure.

Additionally, FIGS. 6 and 7 illustrate results upon completion of tier assignment and insurance scoring. FIG. 6 shows the results of assigning tiers and scoring premiums per tier of the plurality of customers, whereas FIG. 7 shows the results of assigning tiers and scoring renewal rates per tier of the plurality of customers. In an embodiment, a tier assignment model (e.g., a CGR tier model) may be applied by the HIVE transform function to determine tiers for the insurance data corresponding to the plurality of customers. For example, there may be two tiers represented in both FIGS. 6 and 7, wherein the insurance policies for the plurality of customers may be assigned to tier 1 or tier 2. After the insurance policies have been classified into different tiers, the HIVE transform function may be employed once again to distribute the insurance data among the plurality of nodes 220 in order to conduct insurance scoring at each node 220.

In FIGS. 6 and 7, the scored tables 630 and 730, respectively, comprise the compiled results from each of the nodes 220. In an embodiment, the scored tables 630 and 730 may each comprise a single column with the insurance scores (e.g., premiums per tier, renewal rates per tier). In another embodiment, the scored tables 530 and 630 may comprise the data from the input tables 510 and 610, respectively, as well as the corresponding columns with the insurance scores.

Figure 8:
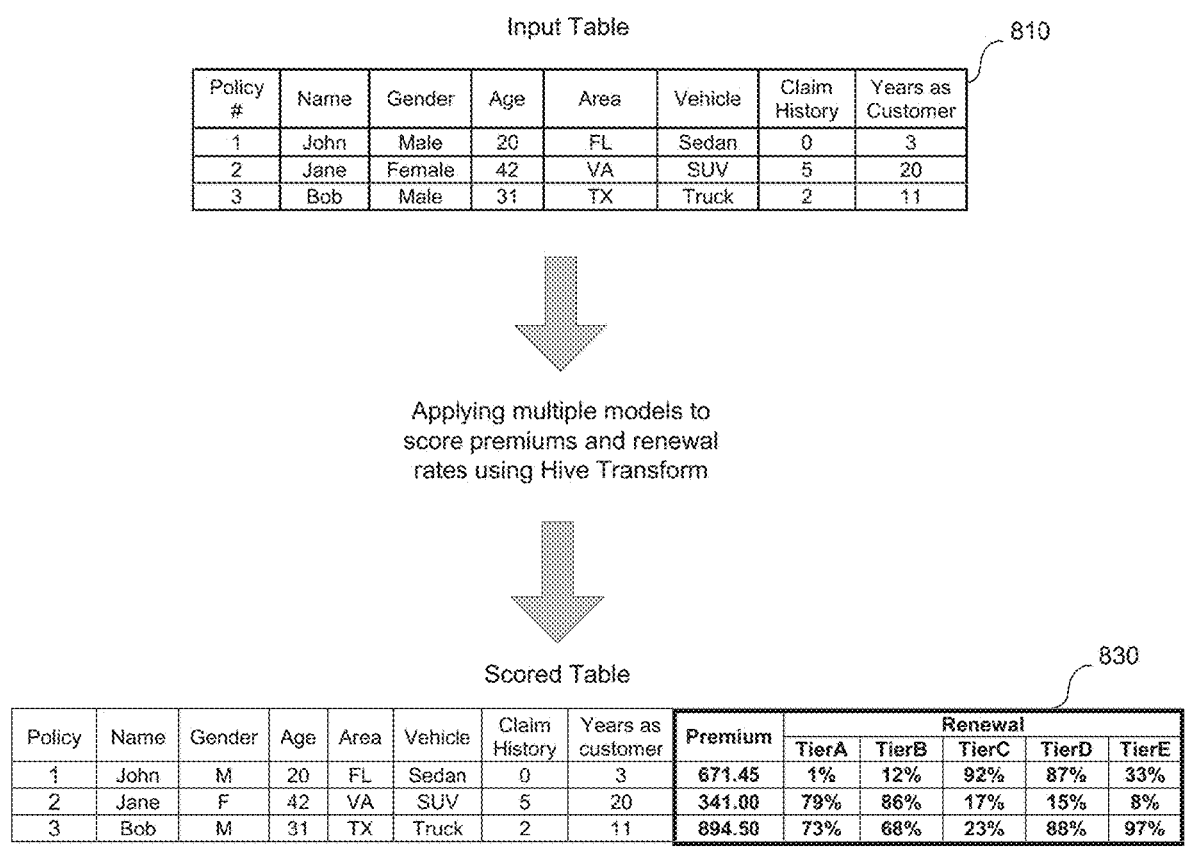
FIG. 8 is a diagram illustrating an example of a results table upon applying multiple models to score insurance data according to aspects of the present disclosure.

Moreover, FIG. 8 illustrates a process of applying multiple models for insurance scoring. FIG. 8 shows the results of applying multiple models to score data in an input table 810. In an embodiment, there may be six predictive models applied to score insurance data in the input table 810, and insurance scoring may produce a results table 830, comprising calculated insurance premiums and renewal rates for a plurality of tiers (e.g., CGR tiers). For example, there may be a first model to calculate insurance premiums, a second model to calculate renewal rates based on tier factor A, a third model to calculate renewal rates based on tier factor B, a fourth model to calculate renewal rates based on tier factor C, a fifth model to calculate renewal rates based on tier factor D, and a sixth model to calculate renewal rates based on tier factor E. A tier factor may be a CGR factor, which comprises a numeric value that may be incorporated into an insurance premium or renewal rate calculation for an insurance policy. In an embodiment, there may be five tier factors (e.g., tier factor A, tier factor B, tier factor C, tier factor D, and tier factor E) that may be employed to calculate respective renewal rates. In another embodiment, there may be two predictive models applied to score insurance data, wherein the two models include a first model to calculate insurance base premiums and a second model to calculate renewal rates dependent on applying a tier factor to the calculated insurance base premium. In an embodiment, the calculated insurance premiums and renewal rates for the different insurance policies may be different as each insurance policy may be assigned to a different tier and/or scaled based on policy specific factor(s).

In order to apply the multiple models, a user may load the models in a scoring script (e.g., scoring script 205), wherein a file directory path to each model file may be passed by the HIVE streaming script (e.g., Transform driver script) to each respective node 220 on which the scoring script is executing. The scoring script may then apply each of the multiple models to score the insurance data in the input table 810. In an embodiment, the models may be applied sequentially to score data, such that renewal rates might not be calculated until after insurance premiums are scored or vice versa. As another method of applying the multiple models, models may be loaded and/or passed to the scoring script one at a time so that scoring of data for each insurance premium and renewal rate column (e.g., columns in bold shown in the results table 830) occurs one by one. In other words, as an alternative to applying multiple models in a single iteration of scoring, the HIVE streaming script and scoring script may be executed multiple times with a different model each time in order to compile the data shown in results table 830.

Figure 9:
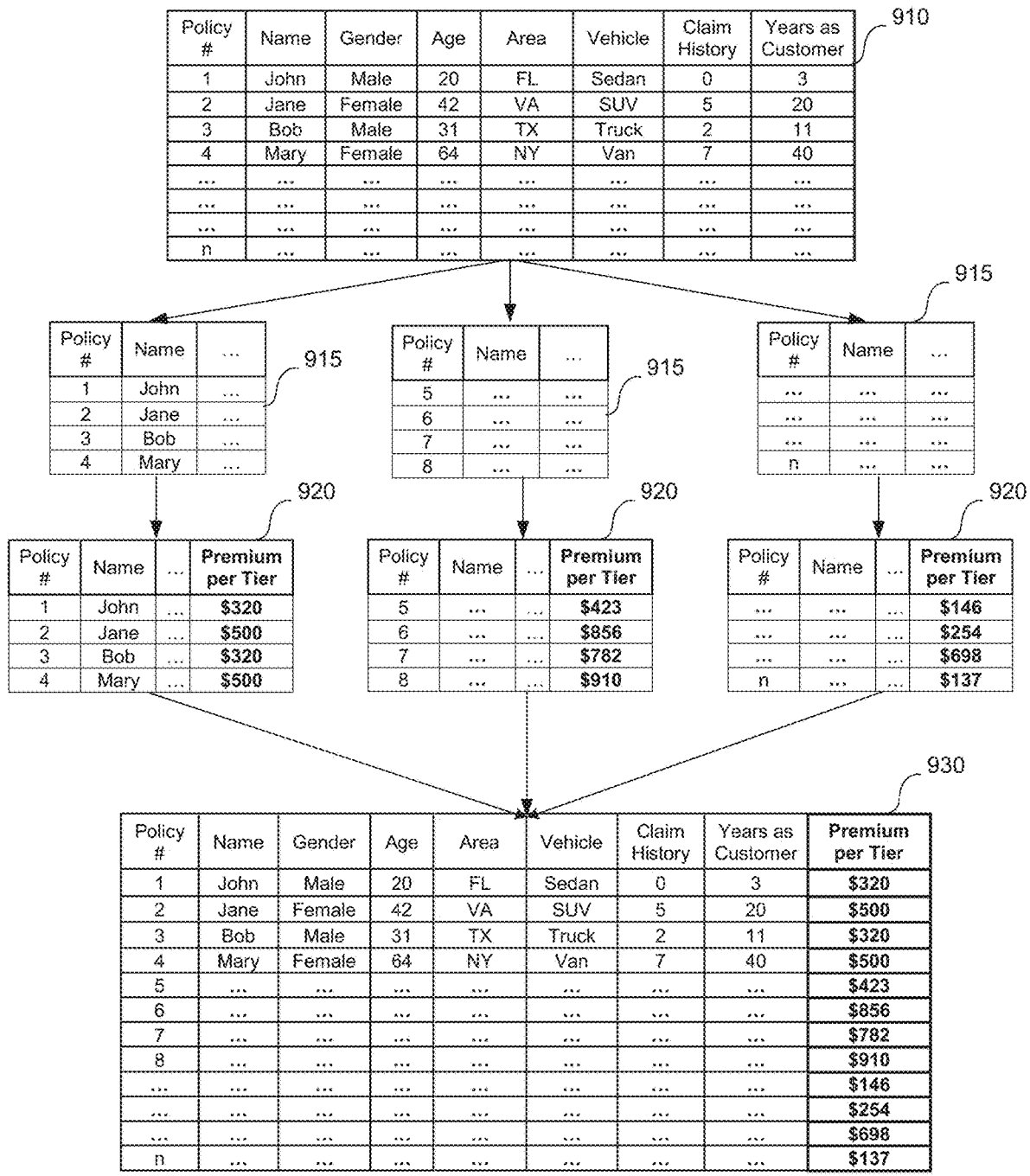
FIG. 9 is a diagram illustrating another example of a results table upon completion of insurance scoring according to aspects of the present disclosure.

FIG. 9 illustrates another example of distributing and scoring insurance data. Specifically, FIG. 9 shows a process of chunking up insurance data in an input table 910 into a plurality of data portions 915. The insurance data in the input table 910 may include insurance factors and a plurality of policy numbers (e.g., n policies) corresponding to a plurality of customers (e.g., n customers). HIVE may be employed to chunk up data in the input table 910 and distribute each of the resulting data portions 915, along with the insurance scoring script 205 and the model 207, to respective nodes 220 in order to conduct insurance scoring at each respective node 220. HIVE may chunk up the data into the plurality of data portions 915 in any manner, wherein any number of the n policies may be included in each data portion 915. For example, there may be 4 policies, 50 policies, 100 policies, or any number of policies in each data portion 915. The data portions 915 may be distributed in any manner to the nodes 220, wherein each data portion 915 may be sent to an arbitrary node 220.

After the plurality of data portions 915 are sent to the plurality of nodes 220, data scoring may be implemented at each node 220. In an embodiment, the HIVE Transform function may be employed to execute the scoring script 205 to generate a calculated score for each row of the insurance data in each data portion 915. This scoring may generate a plurality of scored data portions 920. Each scored data portion 920 may include a new column for the data scores (e.g., premiums per tier), and the scored data portions 920 may be compiled into a results table 930. In an embodiment, the results table 930 may comprise a single column with the insurance scores (e.g., premiums per tier). In another embodiment, the results table 930 may comprise the insurance data from the input table 910, as well as the corresponding column with the insurance scores compiled from the scored data portions 920.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
a master node comprising a memory;
a plurality of nodes in at least one cluster connected to the master node; and
one or more computing devices connected to the master node,
wherein the master node is configured to:
  create an input table in the memory;
  load, into the input table, insurance data associated with a plurality of customers;
  create a first file directory path to an insurance scoring script stored on at least one of the one or more computing devices, a second file directory path to a first predictive model stored on at least one of the one or more computing devices, and a third file directory path to a second predictive model stored on at least one of the one or more computing devices;
  create a results table in the memory, the results table including the input table, a first additional column, and a second additional column;
  assign, using a complementary group rating model and the insurance data, the plurality of customers to a respective tier among a plurality of tiers;
  call a function of a Hive module that:
    divides the insurance data into a plurality of data portions, wherein the insurance data is divided into the plurality of data portions based on a respective tier such that each of the plurality of data portions comprises a portion of the insurance data that is associated with one or more customers in a same tier, and wherein the master node delivers each of the plurality of data portions to a respective one of the plurality of nodes; and
    instructs each of the plurality of nodes to execute, in parallel, the insurance scoring script to sequentially apply the first predictive model and the second predictive model to a specific portion of the plurality of data portions to generate a first plurality of scored results and a second plurality of scored results, respectively, wherein the first predictive model and the second predictive model are different, wherein at least one of the first predictive model and the second predictive model comprises a generalized linear model, a generalized boosted model, or a regression model, wherein the second predictive model generates the second plurality of scored results based on the first plurality of scored results generated by the first predictive model, and wherein the first plurality of scored results comprises insurance premiums or insurance policy renewal rates;

compile and write the first plurality of scored results into the first additional column of the results table and the second plurality of scored results into the second additional column of the results table; and output the results table, comprising the first additional column and the second additional column, to at least one of the one or more computing devices.

2. The system of claim 1,
wherein the master node is further configured to receive a comma separated values file comprising the insurance data and parse the insurance data in the comma separated values file prior to loading the insurance data into the input table, and
wherein the insurance data comprises insurance factors and a plurality of policy numbers corresponding to the plurality of customers.

3. The system of claim 2, wherein the insurance factors comprise at least one of gender, age, area, income, type of home, cost of home, vehicle type, or claim history for each of the plurality of customers.

4. The system of claim 1, wherein the insurance premiums or the insurance policy renewal rates are for a particular tier of the plurality of customers.

5. A method comprising:
creating, by a computer processor of a master node, an input table in a memory of the master node;
loading, into the input table, insurance data of a plurality of customers;
creating a first file directory path to an insurance scoring script, a second file directory path to a first predictive model, and a third file directory path to a second predictive model;
creating, by the computer processor of the master node, a results table in the memory, the results table including the input table, a first additional column, and a second additional column;
calling a function of a Hive module that divides the insurance data into a plurality of data portions and instructs each of a plurality of nodes in at least one cluster to execute, in parallel, the insurance scoring script that sequentially applies the first predictive model and the second predictive model to a specific portion of the plurality of data portions to generate a first plurality of scored results and a second plurality of scored results, respectively, wherein the insurance scoring script applies the first predictive model to generate insurance premiums or insurance policy renewal rates as the first plurality of scored results, wherein the first predictive model and second predictive model are different, wherein at least one of the first predictive model and the second predictive model comprises a generalized linear model, a generalized boosted model, or a regression model, wherein the second predictive model generates the second plurality of scored results based on the first plurality of scored results generated by the first predictive model, and wherein execution, in parallel, of the insurance scoring script comprises:
simultaneously loading, by a first node among the plurality of nodes and a second node among the plurality of nodes, the first predictive model;
simultaneously defining, by the first node and the second node, first model parameters for the first predictive model; and
simultaneously generating, by the first node, a calculated score for each customer of a first portion of the plurality of data portions and generating, by the second node, a calculated score for each customer of a second portion of the plurality of data portions;
compiling and writing, by the computer processor of the master node, the first plurality of scored results into the first additional column of the results table and the second plurality of scored results into the second additional column of the results table; and
outputting the results table, comprising the first additional column and the second additional column, to one or more computing devices.

6. The method of claim 5, wherein the writing comprises inserting all calculated scores into the first additional column of the results table.

7. The method of claim 5,
wherein the insurance data is divided into the plurality of data portions according to a number of the plurality of nodes in the at least one cluster.

8. The method of claim 7, wherein dividing the insurance data is further based on a total file size of the insurance data.

9. The method of claim 5, wherein the function of the Hive module comprises a Hive Transform function.

10. The method of claim 5, wherein the insurance premiums or the insurance policy renewal rates are for a particular tier of the plurality of customers.

11. The system of claim 1,
wherein the first predictive model generates an insurance premium for each of the plurality of customers,
wherein the second predictive model generates a renewal rate for each of the plurality of customers.

12. The system of claim 11, wherein the first predictive model comprises the generalized boosted model, and wherein the insurance scoring script defines a number of trees for the first predictive model.

13. The system of claim 1, wherein the first plurality of scored results comprises insurance premiums and the second plurality of scored results comprises renewal rates.

14. A system comprising:
a master node comprising a memory;
a plurality of nodes in at least one cluster connected to the master node; and
one or more computing devices connected to the master node,
wherein the master node is configured to:
create an input table in the memory;
load, into the input table, insurance data of a plurality of customers;
create a first file directory path to an insurance scoring script, a second file directory path to a first predictive model, and a third file directory path to a second predictive model;
create a results table in the memory, the results table including the input table, a first additional column, and a second additional column;
call a function of a Hive module that divides the insurance data into a plurality of data portions and instructs each of the plurality of nodes to execute, in parallel, the insurance scoring script that sequentially applies the first predictive model and the second predictive model to a specific portion of the plurality of data portions to generate a first plurality of scored results and a second plurality of scored results, respectively, wherein the insurance scoring script applies the first predictive model to generate insurance premiums or insurance policy renewal rates as the first plurality of scored results, wherein the first predictive model and second predictive model are different, wherein at least one of the first predictive model and the second predictive model comprises a generalized linear model, a generalized boosted model, or a regression model, wherein the second predictive model generates the second plurality of scored results based on the first plurality of scored results generated by the first predictive model, and wherein execution, in parallel, of the insurance scoring script comprises:

simultaneously loading, by a first node among the plurality of nodes and a second node among the plurality of nodes, the first predictive model;

simultaneously defining, by the first node and the second node, first model parameters for the first predictive model; and simultaneously generating, by the first node, a calculated score for each customer of a first portion of the plurality of data portions and generating, by the second node, a calculated score for each customer of a second portion of the plurality of data portions;

compile and write the first plurality of scored results into the first additional column of the results table and the second plurality of scored results into the second additional column of the results table; and output the results table, comprising the first additional column and the second additional column, to one or more computing devices.

15. The system of claim 14, wherein writing the first plurality of scored results comprises inserting all calculated scores into the first additional column of the results table.

16. The system of claim 14, wherein the insurance data is divided into the plurality of data portions according to a number of the plurality of nodes in the at least one cluster.

17. The system of claim 16, wherein dividing the insurance data is further based on a total file size of the insurance data.

18. The system of claim 14, wherein the function of the Hive module comprises a Hive Transform function.

19. The system of claim 14, wherein the insurance premiums or the insurance policy renewal rates are for a particular tier of the plurality of customers.

* * * * *